Nov. 2, 1937.  E. B. JACKSON  2,097,622
TIME CONTROLLED SYSTEM
Filed Sept. 15, 1934
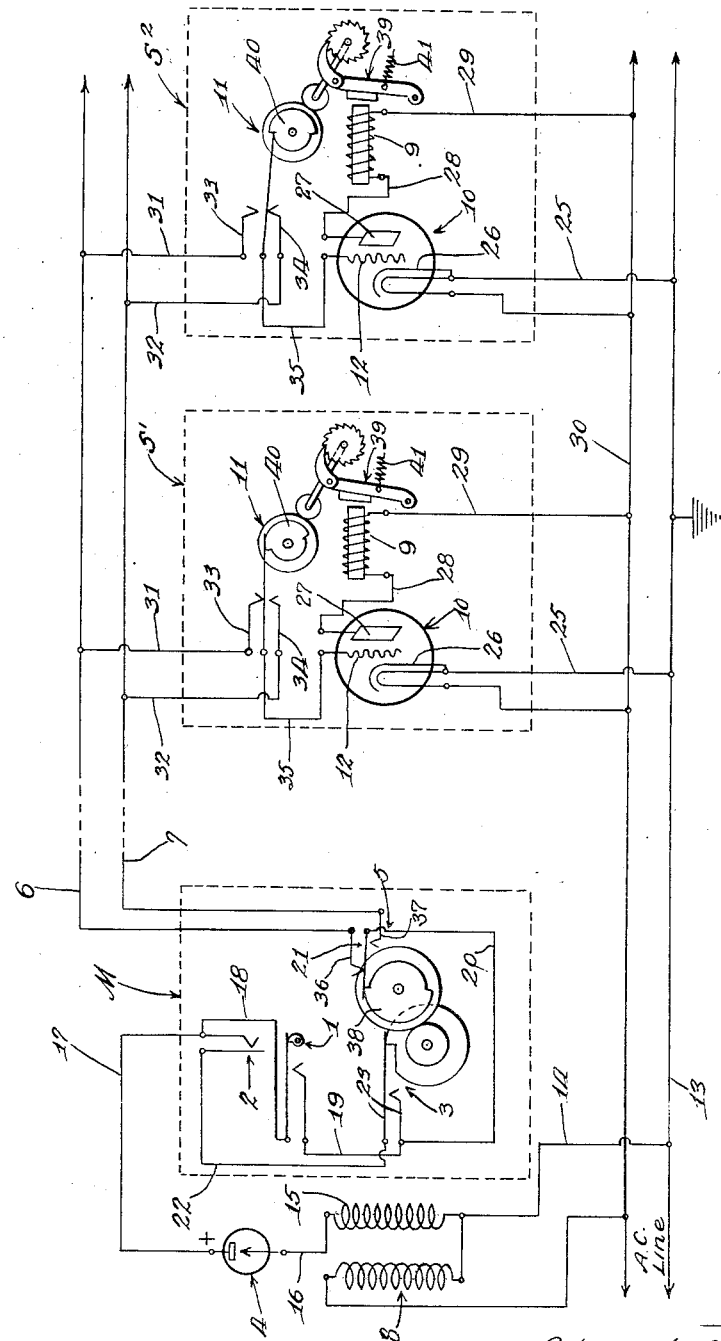
Inventor
Edward B. Jackson.
By Jones, Addington, Ames & Seibold
Attys.

Patented Nov. 2, 1937

2,097,622

UNITED STATES PATENT OFFICE 2,097,622

TIME CONTROLLED SYSTEM

Edward B. Jackson, Downers Grove, Ill., assignor to Stromberg Electric Company, Chicago, Ill., a corporation of Delaware Application September 15, 1934, Serial No. 744,240

8 Claims. (Cl. 58—24)

The present invention relates in general to time controlled systems and more particularly to such systems in which secondary apparatus, such as clocks, recorders, and time stamps are operated periodically, for example once per minute, by a primary or master clock. The main object of the invention is to provide an improved method of control in systems of this type.

According to one feature of the invention, the power or operating current for the secondary apparatus is derived directly from a commercial power source at each secondary apparatus.

According to another feature of the invention, the master clock merely controls the supply of power to the secondary apparatus, permitting the use of small and relatively inexpensive wire for the control circuit connecting the master clock and the secondary apparatus since the operating currents for the secondary magnets are not transmitted thereover.

A further feature of the invention resides in the use of an electron tube in each secondary apparatus for supplying power for the operation of such apparatus, and the control of these tubes from the master clock.

According to another feature of the invention, an improved synchronizing arrangement is provided in which each secondary apparatus is periodically corrected and synchronized with the master clock.

One of the main features of the corrective arrangement is that only one source of current is required and only two wires are necessary in the circuit connecting the master clock with the secondary apparatus. This overcomes the principal objections to the majority of the known corrective systems which require a three wire connecting circuit, or a two wire circuit together with two sources or kinds of current, such as reverse polarities (necessitating a reversing arrangement in the master clock), current of two different voltages, alternating and direct current, or alternating current of two different frequencies.

The above and other objects and features of the invention not specifically brought out above will best be understood from a perusal of the following specification when read in connection with the accompanying drawing, comprising one figure only, which shows by means of the usual schematic diagram, one embodiment of the present invention.

The master apparatus shown comprises a minute contact device 1 for controlling the sending of the regular minute impulses to the secondary apparatus, a rapid contact device 2 for controlling the periodic sending of a number of rapid corrective impulses, a time controlled contact device 3 for periodically cutting the rapid contact device in and out with respect to the circuits to the secondary apparatus, a rectifier 4 for the current supplied to the master apparatus, a time controlled contact device 5 for alternately and periodically switching the impulse sending circuit of the master apparatus from one to the other of two conductors 6 and 7 extending between the master apparatus and the secondary apparatus, and a transformer 8 for controlling the current supply to the master apparatus.

The secondary apparatus shown comprises a driving device including a driving magnet 9 for the secondary apparatus, a vacuum tube 10 for controlling the supply of current to the driving magnet, and a time controlled contact changing device 11 for alternately and periodically switching the circuit for the grid 12 from one to the other of the two conductors 6 and 7 extending between the master and secondary apparatus.

The circuit for the minute contact device 1 in the master clock is from the line conductor 13 through the conductor 14, the secondary 15 of the transformer 8, conductor 16, rectifier 4, conductors 17 and 18, minute contact device 1, and conductors 19 and 20 to the circuit switching device 21.

The circuit for the rapid contact device 2 is from the aforesaid conductor 17, through the rapid contact device 2, conductor 22, time controlled contacts 23, and conductor 20 to the switching device 21.

The circuit for the driving magnet 9 of the secondary apparatus is from the line conductor 13 through the conductor 25, cathode 26, plate 27, conductor 28, driving magnet 9 and conductor 29 to the line conductor 30.

The circuit for the grid is from one or the other of the conductors 6 or 7 through one or the other of the conductors 31 or 32 and one or the other of the contacts 33 or 34 to the conductor 35 leading to the grid 12.

Referring in greater detail to the drawing, M diagrammatically represents the usual and well known master clock having contacts at 1 which are closed once each minute, contacts 23 which may be closed from 59 minutes 10 seconds past the hour until 59 minutes 40 seconds past the hour to cut in the rapid or fast contacts at 2 which may be closed once every two seconds. In addition, the master clock is provided with contacts 36 and 37 which are alternately closed every hour, that is, contacts 36 are closed during odd hours and contacts 37 are closed during even hours. These contacts may be controlled by a two hour cam 38 on the master clock or may be controlled electrically by a sequence or similar switch. The switching over of these contacts occurs after the opening of contacts 23 at 59 minutes 40 seconds after the hour and before the master clock reaches position 60 on the hour.

The secondary apparatus S1 and S2 may be secondary clocks, recorders or time stamps. Magnets 9 are the operating magnets which advance the apparatuses once each minute during normal operation by means of a well known ratchet and pawl construction 39. Contacts 33 and 34 are cam controlled contacts and are switched over once each hour in position 59 of the secondary apparatus. That is, referring to S1, contacts 33 will be closed for a full hour and will be opened and contacts 34 closed when the secondary apparatus reaches position 59. The next time the secondary apparatus reaches position 59, contacts 34 will be opened and contacts 33 will be closed. These contacts may be controlled by a two hour cam 40 in the secondary apparatus.

In the particular embodiment of the invention illustrated in the drawing, the vacuum tubes 10 are gas or vapor content tubes as, for example, the mercury vapor tubes developed by General Electric Company and known by the trade name of "Thyratrons". These tubes have the characteristic that when plate current has once been started by control exercised by the grid, the grid can no longer exercise control to stop plate current, but the plate or anode voltage must be reduced to zero or made negative to stop the current and again allow the grid to assume control. These tubes are, therefore, especially adaptable to the system shown in which commercial alternating current is used as the source of power supply at each secondary apparatus. This is the case, since the plate or anode voltage will be reduced to zero and become negative for one-half of each cycle of the alternating current. The grid, therefore, has an opportunity to resume control 60 times during each second. The plate current of the tube is rectified alternating current, that is, half wave pulsating direct current, and is, therefore, suitable for operating the magnets of the secondary apparatus.

Having given a general description of the drawing and the apparatus disclosed thereon, the operation of the system will now be described in detail.

The contacts at 1 of the master clock M are closed by the master clock movement once each minute in the well known manner. This completes the circuit from the secondary 15 of transformer 8 through rectifier 4, which permits only the positive half waves of the alternating current to pass, contacts at 1, contacts 36, line 6, and over contacts 33 of all secondary apparatuses which have not yet reached the hour, to the grids 12 of the associated tubes 10. The positive potential on the grid of tube 10 causes the gas or mercury vapor in the tube to ionize, allowing plate or anode current to flow during the positive half waves of the alternating current derived from the commercial source over lines 13 and 30. This plate current, which is pulsating direct current, flows through the operating magnet 9 of the secondary apparatus, which operates. The plate return circuit is to the indirectly heated cathode 26.

The contacts at 1 are closed only momentarily and when these contacts open the positive potential is again removed from the grid of the tube 10. When the anode voltage is reduced to zero and becomes negative during the next cycle, the plate current ceases to flow and the mercury vapor in the tube deionizes. Since the grid no longer has a positive potential applied thereto, the plate current will not flow when the plate potential again becomes positive. Accordingly, magnet 9 releases and the secondary apparatus is stepped ahead one minute by the spring 41. It should be mentioned that the grid return to the cathode is over line 13 of the alternating current supply circuit.

The above operation continues throughout the greater part of the hour, advancing the secondary apparatus one step each minute. It will be assumed that the secondary apparatus S2 has in some manner become fast and is ahead of the master clock. When S2 reaches its 59th minute position, the two hour cam 40 opens contacts 33 and closes contacts 34, connecting the grid 12 of the tube 10 to line 7 of the connecting circuit which is now open at the master clock. Accordingly, the secondary apparatus S2 is no longer affected by the positive controlling potentials applied to line 6 and remains in position 59 until released by the master clock as will be explained hereinafter.

It will be assumed that the secondary apparatus S1 has become slow and is lagging behind the master clock. Thus when the master clock reaches its 59th minute position, the secondary apparatus S1 has not yet switched over its contacts 33 and 34. Shortly after the 59th minute, the master clock closed contacts 23 which connects the rapid impulsing contacts 2 in circuit with line 6. These contacts close once every two seconds and at each closure impress a positive potential to the grid 12 of the tube 10 to bring about the operation of the magnet 9 and the advance of S1 in the manner described above. Thus the secondary apparatus S1 is rapidly advanced during the 59th minute to bring it into synchronism with the master clock.

When S1 reaches its 59th minute position, the two hour cam contacts are operated, disconnecting the grid 12 of tube 10 from line 6 and connecting it to line 7. The remainder of the rapid impulses, therefore, do not affect S1. About 59 minutes 40 seconds after the hour, contacts 23 again open and remove the rapid impulsing contacts 2 from the circuit. All of the secondary apparatuses, such as S1 and S2, are now in position 59 and have the grids of their associated tubes connected to line 7 of the connecting circuit.

Shortly before (for example, 10 seconds) the master clock reaches position 60, the two hour cam 38 carried by the master clock opens contacts 36 and closes contacts 37. This disconnects the impulsing contacts from line 6 and connects the same to line 7 of the connecting circuit. When the master clock reaches position 60, contacts 1 are momentarily closed and the positive potential is applied over line 7 to the grids of the tubes in the secondary apparatuses to bring about the operation of such apparatus into position 60 and into synchronism with the master clock. The control during the succeeding hour is exercised over line 7 of the connecting circuit.

For convenience, the terms "impulses" and "impulsing" have been used to describe the control exercised over the connecting circuit between the master clock and the secondary apparatus. It is to be understood, however, that these terms are not limited in the usual sense as referring to current impulses which are used to directly furnish the power for the operation of the secondary apparatus, but refer to the control potentials intermittently applied to the control circuit as well. Although a particular type of tube has been disclosed and described in the drawing and specification, it will be clear that other types of tubes and relaying devices could be substituted therefor without departing from the spirit or scope of the invention.

Having described the invention, what is new and is desired to have protected by Letters Patent will be pointed out in the appended claims.

I claim:

1. In a corrective time controlled system, master apparatus and secondary apparatus connected by two control circuits, means in said master apparatus for intermittently applying a control potential to one of said circuits for the normal and accelerating operation of said secondary apparatus, an operating magnet in said secondary apparatus, a vacuum tube controlled by said control potential for controlling the supply of current impulses to said operating magnet, means for disconnecting said tube from said one circuit and connecting it to said second circuit to suspend advance of said secondary apparatus when it reaches a predetermined chronological position, and means in said master apparatus for transferring said intermittently applied potential from said first to said second circuit when said master apparatus reaches a corresponding chronological position.

2. In a master apparatus for use in a corrective time controlled system, two control circuits extending to secondary apparatus, means for applying a control potential to one of said circuits at regular intervals to control the normal operation of the secondary apparatus and at more rapidly recurring intervals to control the accelerating operation of slow secondary apparatus, said control being exercised over said one circuit for a predetermined time period, and means for thereafter exercising a like control over said second circuit for a like time period.

3. In a master apparatus for use in a corrective time controlled system, two control circuits extending to secondary apparatus, means for applying a control potential to one of said circuits at regular intervals at a relatively slow rate, means for intermittently applying said control potential to said circuit at a much greater rate during one of said first mentioned intervals, and means for thereafter exercising a like control over said second circuit for a like period of time.

4. In a master apparatus for use in a corrective time controlled system, two control circuits extending to secondary apparatus, means for repeatedly applying a predetermined schedule of control potentials to said circuits said schedule comprising the application of said potential at regular intervals for a predetermined period of time and the application of said potential at a rapid rate for a brief predetermined period during one of said intervals, and means for transferring said control from one to the other of said two circuits alternately after each completion of said schedule.

5. In a master apparatus for use in a corrective time controlled system, two control circuits extending to secondary apparatus, means for repeatedly transmitting a cycle of voltage impulses comprising a series of regularly recurring voltage impulses and a series of more rapidly recurring voltage impulses between two successive impulses of said first series, and means for connecting said transmitting means to each of said two control circuits so that said cycle of impulses is alternately transmitted over said two circuits.

6. In a corrective time controlled system, master apparatus and secondary apparatus connected by two control circuits, means in said master apparatus for applying a plurality of voltage impulses at two different rates to one of said circuits for the normal operation and accelerating operation of said secondary apparatus, said plurality of impulses requiring a definite time period, and means for thereafter applying a like plurality of impulses to the other of said circuits during a like time period.

7. In a corrective time controlled system, master apparatus and secondary apparatus connected by two control circuits, means in said master apparatus for applying normal voltage impulses and rapid accelerating voltage impulses to one of said control circuits for the normal operation of said secondary apparatus and the rapid accelerating operation of slow secondary apparatus, means in said master apparatus for alternately and periodically transferring the application of said impulses from one to the other of said circuits in accordance with master apparatus time, means in said secondary apparatus for effecting step by step advance thereof responsive to said voltage impulses, and means for alternately connecting said means to said two circuits operative each time said secondary apparatus reaches a predetermined chronological position and at no other time.

8. In a corrective time controlled system, master apparatus and secondary apparatus connected by two control circuits, a source of alternating current connected to said master and said secondary apparatuses, means in said master apparatus for alternately and periodically applying a cycle of voltage impulses derived from said source to said circuits in accordance with master apparatus time, an operating magnet in said secondary apparatus, a vacuum tube for rectifying alternating current from said source and supplying the rectified current to said magnet to advance said secondary apparatus under control of and responsive to said impulses, and means for alternately and periodically connecting the grid of said tube to said two circuits in accordance with secondary apparatus time, one conductor of said alternating current source serving as a return circuit for said grid.

EDWARD B. JACKSON.